United States Patent
Binek et al.

(10) Patent No.: US 10,989,408 B2
(45) Date of Patent: Apr. 27, 2021

(54) ADDITIVE INTEGRAL COMBUSTOR EXPANSION SPRING

(71) Applicant: United Technologies Corporation, Farmington, CT (US)

(72) Inventors: Lawrence Binek, Glastonbury, CT (US); Evan Butcher, Manchester, CT (US); Matthew B. Kennedy, Vernon, CT (US); Vijay Narayan Jagdale, South Windsor, CT (US); Jesse R. Boyer, Middletown, CT (US); Dmytro Mykolayovych Voytovych, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 159 days.

(21) Appl. No.: 16/130,837

(22) Filed: Sep. 13, 2018

(65) Prior Publication Data
US 2020/0088408 A1 Mar. 19, 2020

(51) Int. Cl.
| F23R 3/00 | (2006.01) |
| F01D 25/24 | (2006.01) |
| F02C 3/14 | (2006.01) |
| F23R 3/50 | (2006.01) |

(52) U.S. Cl.
CPC ............ *F23R 3/002* (2013.01); *F01D 25/246* (2013.01); *F02C 3/14* (2013.01); *F23R 3/50* (2013.01); *F05D 2230/20* (2013.01); *F05D 2240/12* (2013.01); *F23R 2900/00018* (2013.01)

(58) Field of Classification Search
CPC ............ F23R 3/002; F23R 2900/00012; F23R 2900/00001; F23R 3/50; F02C 3/09
See application file for complete search history.

(56) References Cited

U.S. PATENT DOCUMENTS

| 5,105,616 | A | 4/1992 | Bornemisza |
| 5,207,055 | A * | 5/1993 | Shekleton ................ F02C 3/09 60/741 |
| 5,263,315 | A | 11/1993 | Shekleton et al. |
| 2007/0036646 | A1 | 2/2007 | Nguyen et al. |
| 2014/0338347 | A1* | 11/2014 | Gage ........................ F23R 3/16 60/754 |
| 2018/0036843 | A1 | 2/2018 | Hucker et al. |
| 2018/0135517 | A1 | 5/2018 | Mook et al. |

FOREIGN PATENT DOCUMENTS

| FR | 1033849 | 7/1953 |
| JP | 2002013401 | 1/2002 |
| JP | 2015206325 | 11/2015 |
| WO | 2004092567 | 10/2004 |

OTHER PUBLICATIONS

European Patent Office, European Search Report dated Feb. 4, 2020 in Application No. 19196938.5.

* cited by examiner

Primary Examiner — Katheryn A Malatek
(74) Attorney, Agent, or Firm — Snell & Wilmer L.L.P.

(57) ABSTRACT

A component for a gas turbine engine is disclosed. In various embodiments, the component includes a diffuser ring, a combustor and a spring element connecting the diffuser ring to the combustor.

18 Claims, 5 Drawing Sheets

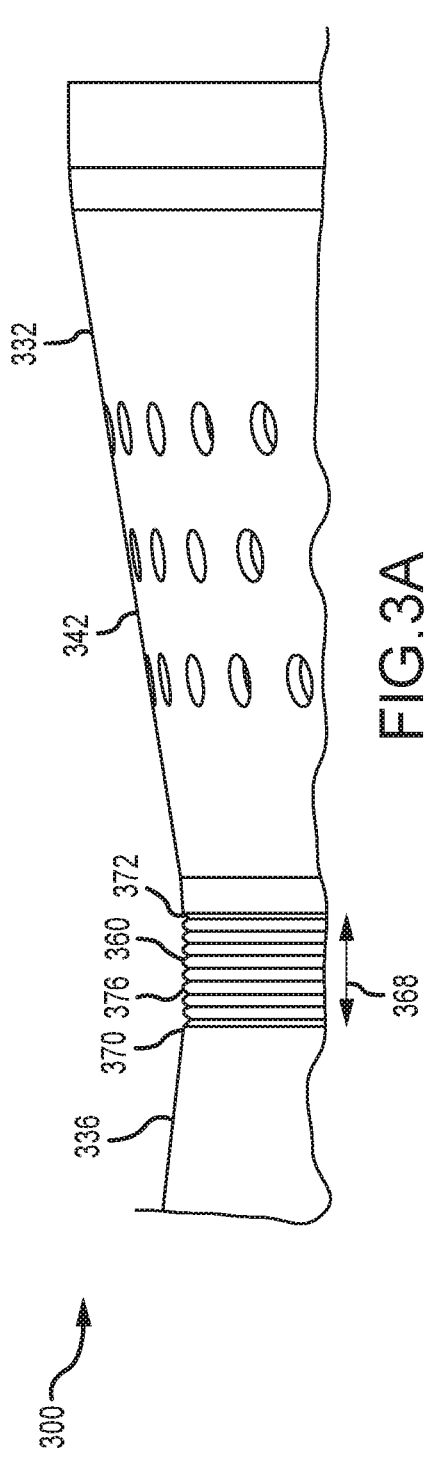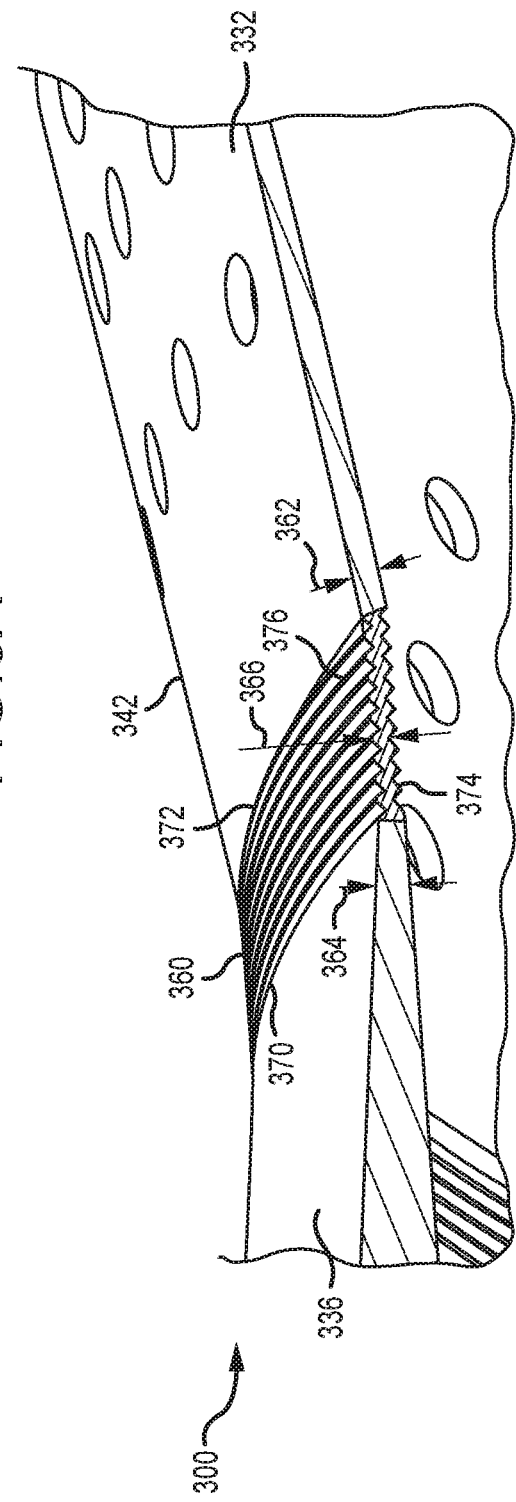

ADDITIVE INTEGRAL COMBUSTOR EXPANSION SPRING

FIELD

The present disclosure relates to gas turbine engines and, more particularly, to miniature gas turbine engines having a diffuser and combustor integrally connected by a spring element via an additively manufactured process.

BACKGROUND

Conventional gas turbine engines, such as those used to power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

Miniature gas turbine engines operate in much the same way as conventional gas turbine engines operate in that a fuel is combusted in the presence of compressed air to generate high energy gases for producing thrust and powering a compressor. As with a conventional gas turbine engine, a turbine is used to drive the compressor to compress air for the combustion process and to drive a fan or eject gases at high velocity to produce thrust. Miniature gas turbine engines are, however, much smaller such that they are readily applicable as propulsion systems for small vehicles. For example, miniature gas turbine engines are often used as propulsion systems for small-scale aircraft, such as, for example, reconnaissance drones. Miniature gas turbine engines extend the range of these small-scale aircraft beyond what is traditionally available from conventional rocket engines. While miniature gas turbine engines often operate under expendable circumstances, it is nevertheless desirable for the engines to exhibit reliability and, at the same time, be cost effective.

SUMMARY

A component for a gas turbine engine is disclosed. In various embodiments, the component includes a diffuser ring, a combustor and a spring element connecting the diffuser ring to the combustor.

In various embodiments, the combustor includes a radially inner wall and a radially outer wall and the spring element is connected to the radially outer wall. In various embodiments, the spring element includes a radially inner surface and a radially outer surface and at least one of the radially inner surface and the radially outer surface is characterized by an undulating surface. In various embodiments, the radially inner surface includes a radially inner undulating surface and the radially outer surface includes a radially outer undulating surface. In various embodiments, the radially outer surface includes a radially outer undulating surface and the radially inner surface includes a radially inner flat surface.

In various embodiments, the spring element includes a spring element local thickness that is less than or equal to one or both of a radially outer wall thickness and a diffuser ring thickness. In various embodiments, the spring element includes a radially inner surface and a radially outer surface and at least one of the radially inner surface and the radially outer surface includes an undulating surface. In various embodiments, the radially outer surface includes a radially outer undulating surface that is characterized by one or more of a sine wave, a triangle wave or a saw-tooth wave. In various embodiments, the radially inner surface is characterized by a radially inner flat surface. In various embodiments, the radially inner surface includes a radially inner undulating surface, the radially outer surface includes a radially outer undulating surface and both the radially inner undulating surface and the radially outer undulating surface are characterized by one or more of a sine wave, a triangle wave or a saw-tooth wave.

A miniature gas turbine engine component manufactured by an additive manufacturing process is disclosed. In various embodiments, the component includes a diffuser ring, a combustor and a spring element connecting the diffuser ring to the combustor.

In various embodiments, the combustor includes a radially inner wall and a radially outer wall and the spring element is connected to the radially outer wall. In various embodiments, the spring element includes a spring element local thickness that is less than or equal to one or both of a radially outer wall thickness and a diffuser ring thickness. In various embodiments, the spring element includes a spring element global thickness that is less than or equal to one or both of the radially outer wall thickness and the diffuser ring thickness. In various embodiments, the spring element includes a radially inner surface and a radially outer surface and wherein at least one of the radially inner surface and the radially outer surface includes an undulating surface.

In various embodiments, the radially outer surface includes a radially outer undulating surface and wherein the radially outer undulating surface is characterized by one or more of a sine wave, a triangle wave or a saw-tooth wave. In various embodiments, the radially inner surface is characterized by a radially inner flat surface. In various embodiments, the radially inner surface includes a radially inner undulating surface, the radially outer surface includes a radially outer undulating surface and both the radially inner undulating surface and the radially outer undulating surface are characterized by one or more of a sine wave, a triangle wave or a saw-tooth wave.

An aircraft is disclosed. In various embodiments, the aircraft includes a fuselage having an intake duct and an exhaust duct and a miniature gas turbine engine configured to receive air from the intake duct and to expel the air through the exhaust duct following a combustion process. In various embodiments, the miniature gas turbine engine includes a diffuser ring, a combustor and a spring element connecting the diffuser ring to the combustor.

In various embodiments, the combustor includes a radially inner wall and a radially outer wall. The spring element is connected to the radially outer wall and includes a spring element local thickness that is less than or equal to one or both of a radially outer wall thickness and a diffuser ring thickness. The spring element also includes a radially inner surface and a radially outer surface and at least one of the radially inner surface and the radially outer surface is characterized by an undulating surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A and 3B are schematic views of a diffuser section and combustor section having an expansion spring between them, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
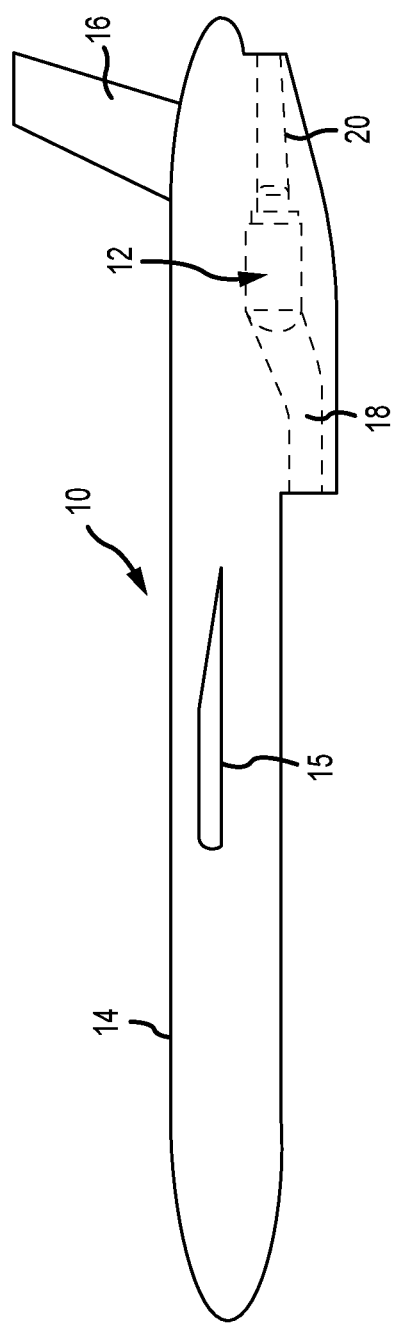
FIG. 1 is a schematic view of a vehicle including a miniature gas turbine engine, in accordance with various embodiments.

Referring now to FIG. 1 a vehicle 10 having a miniature gas turbine engine 12 is illustrated, in accordance with various embodiments. The vehicle 10 includes a fuselage 14, which further includes a wing 16 (or pair of wings) and a rudder or stabilizer 18. In various embodiments, the fuselage 14 also includes an intake duct 20 and an exhaust duct 22, between which is disposed the miniature gas turbine engine 12. The intake duct 20 is open to the outside of the fuselage 14 such that ambient air is permitted to enter the miniature gas turbine engine 12. As described further below, in various embodiments, the miniature gas turbine engine 12 compresses and mixes the ambient air with a fuel carried onboard the vehicle 10 to carry out a combustion process for producing thrust. Exhaust gas produced by the combustion process is expelled from miniature gas turbine engine 12 to produce thrust and is passed from the vehicle 10 through the exhaust duct 22. In other embodiments, the miniature gas turbine engine 12 is coupled to an exterior of the fuselage 14 by conventional means and operates in much the same manner as herein described.

In various embodiments, the miniature gas turbine engine 12 is configured for use in small-scale systems, such as, the vehicle 10 and, in various embodiments, is approximately twelve to thirteen inches 30.5-33.0 cm) in length. The vehicle 10 illustrated in FIG. 1 is representative of various reusable and single-use applications in which the miniature gas turbine engine 12 may be used. For example, in various embodiments, the vehicle 10 may comprise either a reconnaissance drone aircraft or an air-launched or ground-launched cruise missile. Thus, the vehicle 10 is often called upon to perform critical missions and flight objectives that require reliable performance of the miniature gas turbine engine 12. Furthermore, it is preferable that the miniature gas turbine engine 12 be inexpensive to reduce costs associated with missions in which the vehicle 10 is expendable.

Figure 2:
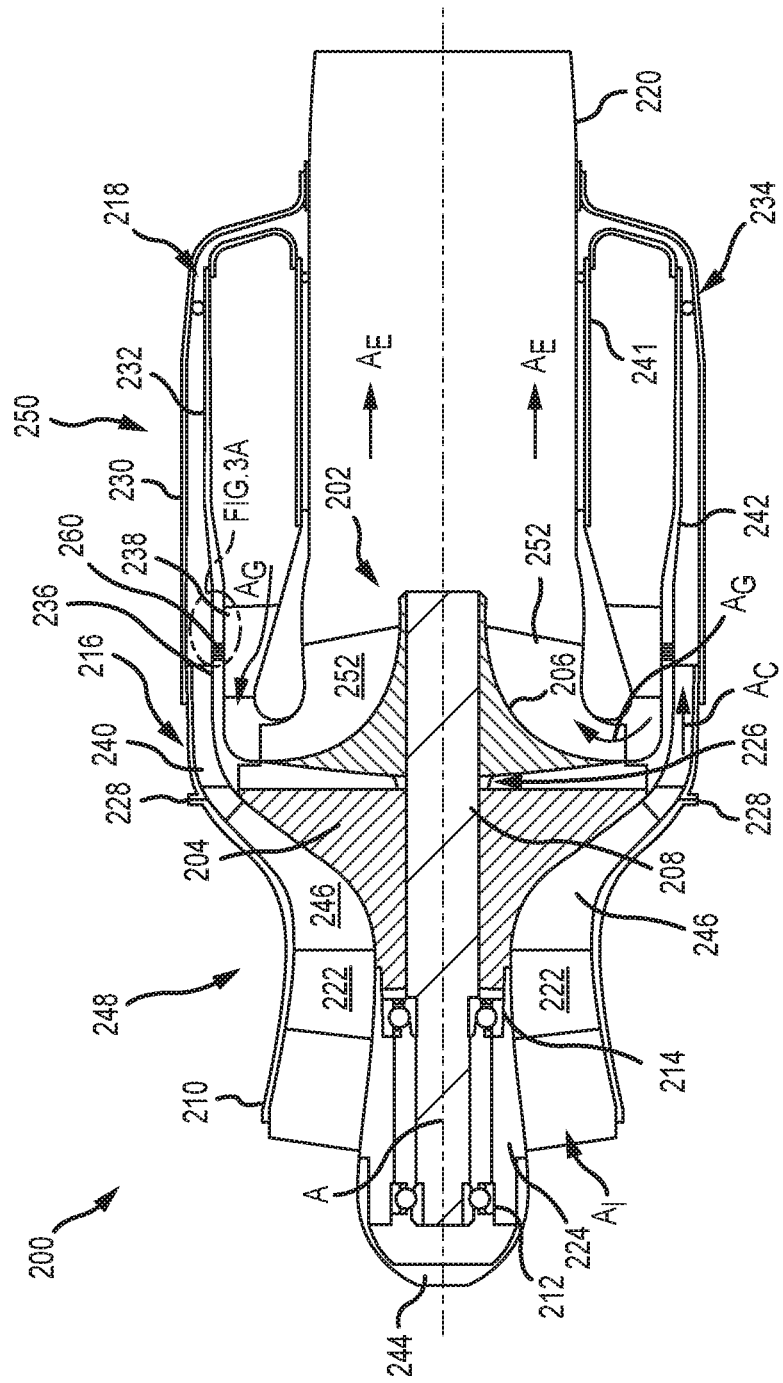
FIG. 2 is a schematic cross sectional view of a miniature gas turbine engine, in accordance with various embodiments.

Referring now to FIG. 2, a cross sectional, schematic view of a miniature gas turbine engine 200 is provided. In various embodiments, the miniature gas turbine engine 200 includes a rotor assembly 202, which comprises three main components: a compressor wheel 204, a turbine wheel 206 and a turbine shaft 208. The miniature gas turbine engine 200 also includes an inlet housing 210, a forward bearing 212, an aft bearing 214, a diffuser assembly 216, a combustion system 218, an exhaust nozzle 220, one or more struts 222 and a shaft support 224. In various embodiments, a coupling system 226 is placed between the compressor wheel 204 and the turbine wheel 206. In various embodiments, the miniature gas turbine engine 200 utilizes a radial interference fit to retain the compressor wheel 204 and the turbine wheel 206 joined with the turbine shaft 208, such that the turbine shaft 208 rotates smoothly within the forward bearing 212 and the aft bearing 214 while the turbine wheel 206 rotates within the diffuser assembly 216. The rotating components generally rotate about a central longitudinal axis A.

In various embodiments, the diffuser assembly 216 is connected to the inlet housing 210 using, for example, threaded fasteners at a flanged coupling 228, and a combustor housing 230 extends axially downstream from the diffuser assembly 216 to surround the combustion system 218. In various embodiments, the combustion system 218 includes a combustor 232 and a fuel manifold 234, and the diffuser assembly 216 includes a diffuser ring 236 (or divider), an inner flow diverter 238 and an outer flow diverter 240. In various embodiments, the combustor 232 comprises an annular hollow body in which the combustion process of the miniature gas turbine engine 200 is carried out. In various embodiments, the combustor housing 230 is connected to the diffuser assembly 216 and to the exhaust nozzle 220. In various embodiments, a radially inner wall 241 of the combustor 232 rests against an external surface of the exhaust nozzle 220 and is connected with the diffuser ring 236 at its forward end, thereby allowing the combustor to expand and contract in an axial direction due to thermal loads from the combustion process.

In various embodiments, the inlet housing 210 is configured to receive a flow of inlet air, $A_I$, from an intake duct, such as, for example, the intake duct 20 described above with reference to FIG. 1. In various embodiments, an end cap 244 diverts the inlet air $A_I$ around the shaft support 224 and into the inlet housing 210. The one or more struts 222 may also function as inlet guide vanes to direct the inlet air $A_I$ into the compressor wheel 204. In various embodiments, the compressor wheel 204 includes a plurality of compressor blades 246, which are disposed on a radially outward exposed face of the compressor wheel 204 to face the inlet housing 210 and the diffuser assembly 216. The compressor blades 246 comprise aerodynamically contoured blades that face the upstream direction where the inlet air $A_I$ is received. The surface of the compressor wheel 204 slopes outward toward the inlet housing 210 so as to comprise a centrifugal or radial flow compressor. The cross sectional area of the compressor blades 246 decreases along a flow path defined by the compressor wheel 204 such that the intake air $A_I$ is compressed to form a compressed air, $A_C$, where the air exits the inlet housing 210 and enters the diffuser assembly 216.

The diffuser assembly 216 comprises an annular body for connecting a cold section 248 and a hot section 250 of the miniature gas turbine engine 200. The diffuser assembly 216 guides the compressed air $A_C$ into the combustor 232 and the combustion gases $A_G$ away from the combustor 232. In various embodiments, the compressed air $A_C$ enters the diffuser assembly 216 at the outer flow diverter 240, which extends along the outer surface of the diffuser ring 236, where the air is reoriented to flow in the axial direction before entering the combustor 232. The combustion gases $A_G$ exit the combustor 232 and reenter the diffuser assembly 216 at the inner flow diverter 238, which extends along the inner surface of the diffuser ring 236, where the gases are reoriented in flow direction prior to entering the turbine wheel 206.

In various embodiments, the combustor 232 comprises a U-shaped annular body that transforms the downstream flow of the compressed air $A_C$ to an upstream flow of the combustion gases $A_G$ resulting from the combustion process. A radially outer wall 242 of the combustor 232 includes an array of small holes or apertures (see FIGS. 3A and 3B) that permit the compressed air $A_C$ to enter an interior portion of the combustor 232. The fuel manifold 234 injects a supply of fuel into the interior portion of the combustor 232. The fuel is ignited with an ignition system to initiate and sustain the combustion process between the fuel and the compressed air $A_C$. The combustion process generates the combustion gases $A_G$, at high temperature and energy, which are then directed toward the turbine wheel 206 by the diffuser ring 236.

The combustion gases $A_G$ impinge upon the turbine blades 252 of the turbine wheel 206, whereupon the turbine blades 252 extract some of the energy from the combustion gases $A_G$ to turn both the turbine wheel 206 and the compressor wheel 204, which thereby produces the compressed air $A_C$ and sustains the combustion process. The turbine wheel 206 comprises a radially outward exposed face from which the turbine blades 252 extend. The turbine blades 252 comprise aerodynamically contoured blades that face the downstream direction such that they expel exhaust gases $A_E$ in the downstream direction. The outward exposed face of turbine wheel 206 slopes inward toward the exhaust nozzle 220 in the direction of flow so as to comprise a radial flow turbine. The cross sectional area of turbine blades 252 increase such that the exhaust gas $A_E$ is permitted to expand as it exits the turbine blades 252 and enters the exhaust nozzle 220. The compressor wheel 204, through the turbine shaft 208 and the turbine wheel 206, rotates to continuously compress the inlet air $A_I$ within the compressor blades 246 to sustain the combustion process. The exhaust gas $A_E$ also produces thrust to drive the miniature gas turbine engine 200 in the forward direction as the exhaust gas $A_E$ exits the exhaust nozzle 220 and, subsequently, an exhaust duct, such as, for example, the exhaust duct 22 described above with reference to FIG. 1.

Referring now to FIGS. 3A and 3B, a component 300 (or a miniature gas turbine engine component) is illustrated, having a diffuser ring 336, a radially outer wall 342 of a combustor 332 and a spring element 360. In various embodiments, the diffuser ring 336, the radially outer wall 342 of the combustor 332 and the spring element 360 are similar to the diffuser ring 236, the radially outer wall 242 of the combustor 232 and the spring element 260 described above with reference to FIG. 2. The radially outer wall 342 of the combustor 332 includes a radially outer wall thickness 362 proximate the spring element 360. Similarly, the diffuser ring 336 includes a diffuser ring thickness 364 proximate the spring element 360. In various embodiments, the spring element 360 includes a spring element thickness 366 that may extend along an spring element length 368 of the spring element 360, from a first axial position 370, defined by the intersection of the spring element 360 and the diffuser ring 336, to a second axial position 372, defined by the intersection of the spring element 360 and the radially outer wall 242 of the combustor 232.

In various embodiments, the spring element 360 is an element that introduces a localized degree of elasticity into the component 300 that has an effective spring constant (e.g., due to the design of the spring element 360 as well as the material used in its construction) less than the effective spring constants of the corresponding diffuser ring 336 and the radially outer wall 342 of the combustor 332. The localized effective spring constant associated with the spring element 360 that is less than the effective spring constants of the diffuser ring 336 and the radially outer wall of the combustor 332 enables relative movement, in the axial and radial directions, of the combustor 332 with respect to the diffuser ring 336 by expansion and contraction and radially shifting of the spring element 360 due, for example, to thermal loads introduced into the spring element 360 by the combustion process occurring in the combustor 332. In various embodiments, the spring element 360 includes a radially inner surface 374 and a radially outer surface 376. In various embodiments, one or both of the radially inner surface 374 and the radially outer surface 376 is an undulating surface (e.g., a radially inner undulating surface or a radially outer undulating surface), defined by, for example, a sine wave, a saw-tooth wave or a triangle wave. In various embodiments, one or both of the radially inner surface 374 and the radially outer surface 376 is a non-undulating surface (e.g., a radially inner flat surface or a radially outer flat surface), defined by, for example, a flat or cylindrical surface extending circumferentially about the spring element 360. In various embodiments, the effective spring constant of the spring element 360 may be made lesser in value than the effective spring constants of the corresponding diffuser ring 336 and the radially outer wall 342 of the combustor 332 by introducing one or more of the undulating surfaces described above into the spring element 360 along the spring element length 368, such that, for example, the spring element thickness 366 is less in a region of the spring element 360 than the corresponding radially outer wall thickness 362 and the diffuser ring thickness 364.

Referring now to FIGS. 4A, 4B, 4C and 4D, various embodiments of a spring element are illustrated, similar to the spring element 360 described above with reference to FIGS. 3A and 3B. For example, in FIG. 4A, a spring element 460a is illustrated extending from a first axial position 470a to a second axial position 472a. The spring element 460a includes a radially inner surface 474a and a radially outer surface 476a. In various embodiments, the radially inner surface 474a is an undulating surface having the form of a sine wave. In various embodiments, the radially outer surface 476a is an undulating surface having the form of a sine wave. In various embodiments, the spring element 460a may be defined by a local spring thickness 480a (or spring element local thickness), which is the thickness of the spring element 460a at any point along a length 468a of the spring element 460a from the first axial position 470a to the second axial position 472a. In various embodiments, the local spring thickness 480a may vary as a function of position along the length 468a. In various embodiments, the spring element 460a may also be defined by a global spring thickness 482a (or spring element global thickness), which is the distance between a radially outermost location 477a on the radially outer surface 476a and a radially innermost location 475a on the radially inner surface 474a. In various embodiments, the spring element 460a may be further defined by a wavelength 484a, which is the distance between adjacent peaks or troughs of one or both of the undulating surfaces. In various embodiments, the wavelength 484a may be greater or less than or equal to the local spring thickness 480a. In various embodiments, the global spring thickness 482a may be greater or less than or equal to the local spring thickness 480a.

Figure 4A:
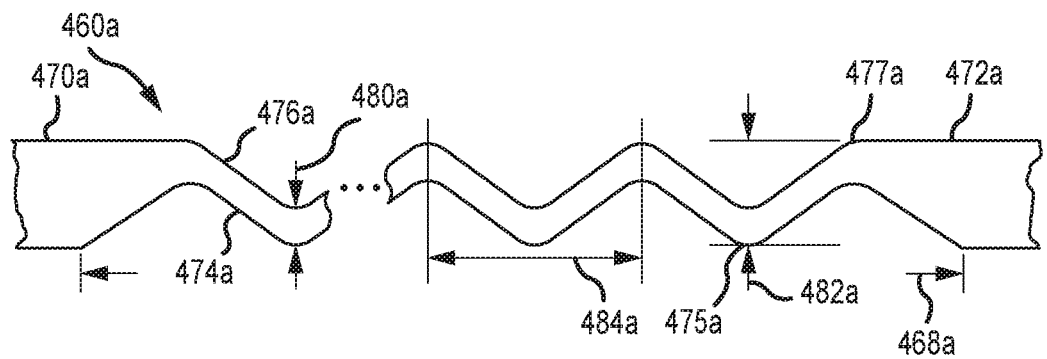
FIGS. 4A, 4B and 4C are schematic cross sectional views of a spring element, in accordance with various embodiments.
Figure 4B:
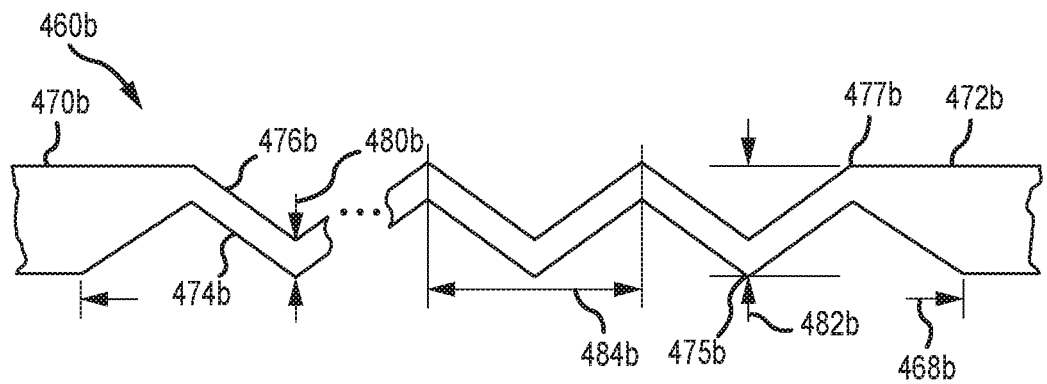

Referring to FIG. 4B, a spring element 460b is illustrated extending from a first axial position 470b to a second axial position 472b. The spring element 460b includes a radially inner surface 474b and a radially outer surface 476b. In various embodiments, the radially inner surface 474b is an undulating surface having the form of a triangle wave. In various embodiments, the radially outer surface 476b is an undulating surface having the form of a triangle wave. In various embodiments, the spring element 460b may be defined by a local spring thickness 480b, which is the thickness of the spring element 460b at any point along a length 468b of the spring element 460b from the first axial position 470b to the second axial position 472b. In various embodiments, the local spring thickness 480b may vary as a function of position along the length 468b. In various embodiments, the spring element 460b may also be defined by a global spring thickness 482b, which is the distance between a radially outermost location 477b on the radially outer surface 476b and a radially innermost location 475b on the radially inner surface 474b. In various embodiments, the spring element 460b may be further defined by a wavelength 484b, which is the distance between adjacent peaks or troughs of one or both of the undulating surfaces. In various embodiments, the wavelength 484b may be greater or less than or equal to the local spring thickness 480b. In various embodiments, the global spring thickness 482b may be greater or less than or equal to the local spring thickness 480b.

Figure 4C:
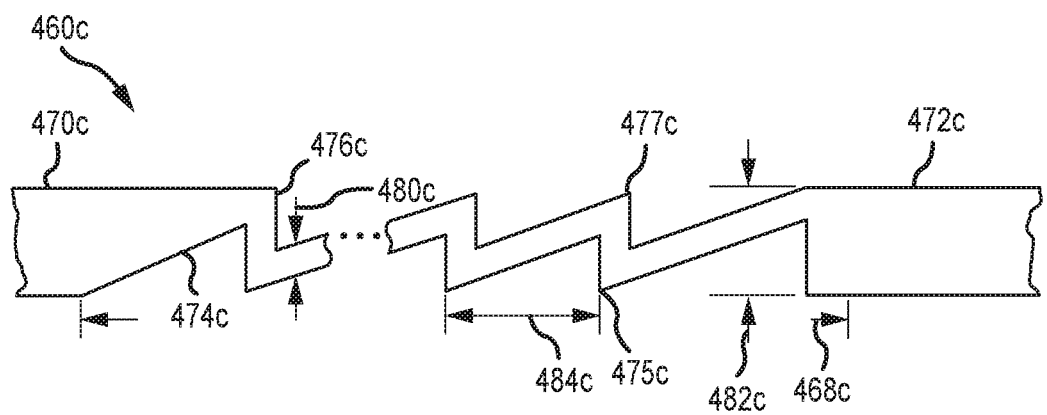

Similarly, referring to FIG. 4C, a spring element 460c is illustrated extending from a first axial position 470c to a second axial position 472c. The spring element 460c includes a radially inner surface 474c and a radially outer surface 476c. In various embodiments, the radially inner surface 474c is an undulating surface having the form of a saw-tooth wave. In various embodiments, the radially outer surface 476c is an undulating surface having the form of a saw-tooth wave. In various embodiments, the spring element 460c may be defined by a local spring thickness 480c, which is the thickness of the spring element 460c at any point along a length 468c of the spring element 460c from the first axial position 470c to the second axial position 472c. In various embodiments, the local spring thickness 480c may vary as a function of position along the length 468c. In various embodiments, the spring element 460c may also be defined by a global spring thickness 482c, which is the distance between a radially outermost location 477c on the radially outer surface 476c and a radially innermost location 475c on the radially inner surface 474c. In various embodiments, the spring element 460c may be further defined by a wavelength 484c, which is the distance between adjacent peaks or troughs of one or both of the undulating surfaces. In various embodiments, the wavelength 484c may be greater or less than or equal to the local spring thickness 480c. In various embodiments, the global spring thickness 482c may be greater or less than or equal to the local spring thickness 480c.

Figure 5:
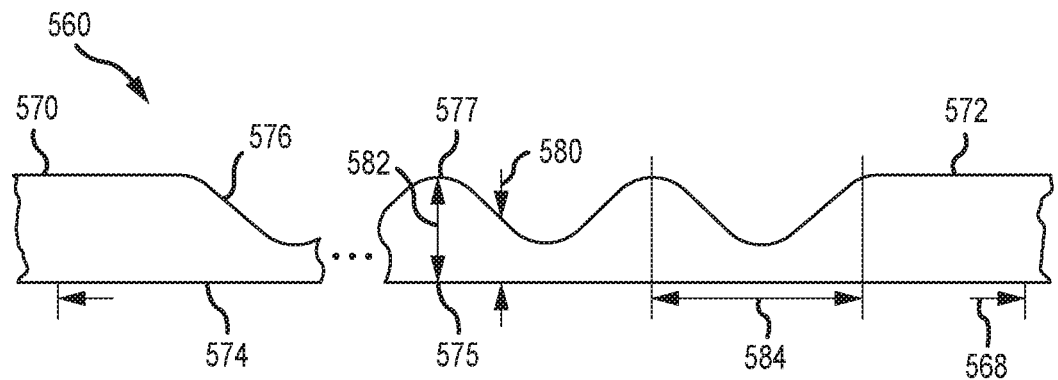
FIG. 5 is a schematic cross sectional view of a spring element, in accordance with various embodiments.
Figure 6A:
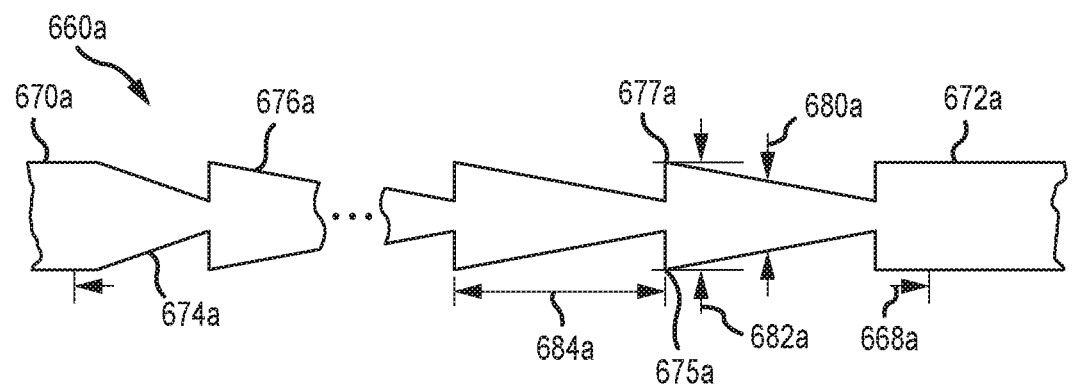
FIGS. 6A and 6B is a schematic cross sectional view of a spring element, in accordance with various embodiments.
Figure 6B:
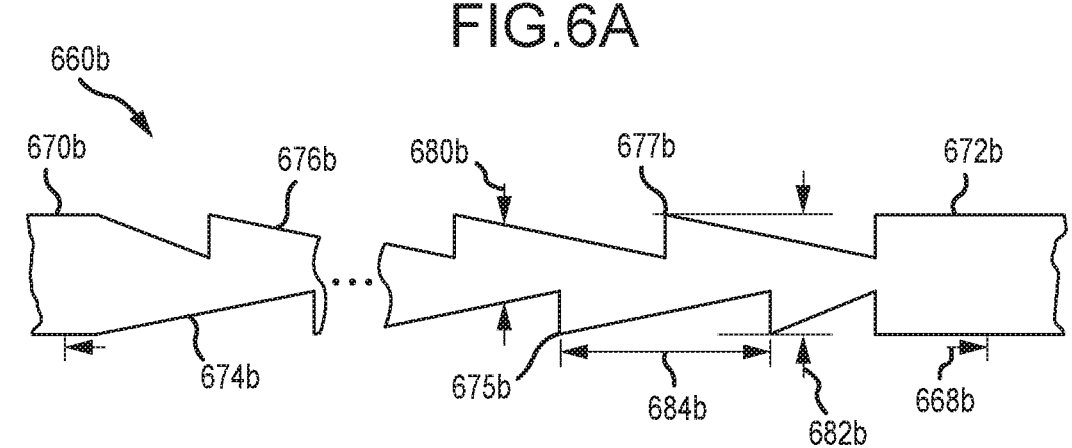

The foregoing embodiments describe what can be termed periodic spring elements—i.e., spring elements where the radially outer surface and the radially inner surface are geometrically identical and in-phase with one another (e.g., for the case of constant local spring thickness) or geometrically similar and in-phase with one another (e.g., for the case of non-constant local spring thickness). Referring to FIGS. 5 and 6A and 6B, various additional embodiments of spring elements are described. Referring to FIG. 5, for example, a spring element 560 is illustrated extending from a first axial position 570 to a second axial position 572. The spring element 560 includes a radially inner surface 574 and a radially outer surface 576. In various embodiments, the radially inner surface 574 is a flat or non-undulating surface. In various embodiments, the radially outer surface 576 is an undulating surface having the form of a sine wave, as illustrated, or a triangle wave or saw tooth wave as described and illustrated above with reference to FIGS. 4B and 4C. In various embodiments, the spring element 560 may be defined by a local spring thickness 580, which is the thickness of the spring element 560 at any point along a length 568 of the spring element 560 from the first axial position 570 to the second axial position 572. As illustrated, the local spring thickness 580 varies as a function of position along the length 568. In various embodiments, the spring element 560 may also be defined by a global spring thickness 582, which is the distance between a radially outermost location 577 on the radially outer surface 576 and a radially innermost location 575 on the radially inner surface 574. In various embodiments, the spring element 560 may be further defined by a wavelength 584, which is the distance between adjacent peaks or troughs of one or both of the undulating surfaces.

Referring now to FIGS. 6A and 6B, various embodiments of a spring element are illustrated, similar to the spring element 360 described above with reference to FIGS. 3A and 3B. Referring now, for example, to FIG. 6A, a spring element 660a is illustrated extending from a first axial position 670a to a second axial position 672a. The spring element 660a includes a radially inner surface 674a and a radially outer surface 676a. In various embodiments, the radially inner surface 674a is an undulating surface having the form of a saw-tooth wave, as illustrated, or a sine wave or triangle wave as described and illustrated above with reference to FIGS. 4A and 4B. In various embodiments, the radially outer surface 676a is an undulating surface having the form of a saw-tooth wave, as illustrated, or a sine wave or triangle wave as described and illustrated above with reference to FIGS. 4A and 4B. In various embodiments, the spring element 660a may be defined by a local spring thickness 680a, which is the thickness of the spring element 660a at any point along a length 668a of the spring element 660a from the first axial position 670a to the second axial position 672a. As illustrated, the local spring thickness 680a varies as a function of position along the length 668a. In various embodiments, the spring element 660a may also be defined by a global spring thickness 682a, which is the distance between a radially outermost location 677a on the radially outer surface 676a and a radially innermost location 675a on the radially inner surface 674a. In various embodiments, the spring element 660a may be further defined by a wavelength 684a, which is the distance between adjacent peaks or troughs of one or both of the undulating surfaces. In various embodiments, the undulating surfaces of the radially inner surface 674a and the radially outer surface 676a are symmetric and in-phase with one another.

Referring now to FIG. 6B, a spring element 660b is illustrated extending from a first axial position 670b to a second axial position 672b. The spring element 660b includes a radially inner surface 674b and a radially outer surface 676b. In various embodiments, the radially inner surface 674b is an undulating surface having the form of a saw-tooth wave, as illustrated, or a sine wave or triangle wave as described and illustrated above with reference to FIGS. 4A and 4B. In various embodiments, the radially outer surface 676b is an undulating surface having the form of a saw-tooth wave, as illustrated, or a sine wave or triangle wave as described and illustrated above with reference to FIGS. 4A and 4B. In various embodiments, the spring element 660b may be defined by a local spring thickness 680b, which is the thickness of the spring element 660b at any point along a length 668b of the spring element 660b from the first axial position 670b to the second axial position 672b. As illustrated, the local spring thickness 680b varies as a function of position along the length 668b. In various embodiments, the spring element 660b may also be defined by a global spring thickness 682b, which is the distance between a radially outermost location 677b on the radially outer surface 676b and a radially innermost location 675b on the radially inner surface 674b. In various embodiments, the spring element 660b may be further defined by a wavelength 684b, which is the distance between adjacent peaks or troughs of one or both of the undulating surfaces. In various embodiments, the wavelength of one undulating surface need not be the same as the wavelength of the other undulating surface. In various embodiments, the undulating surfaces of the radially inner surface 674b and the radially outer surface 676b are non-symmetric and out of phase with one another.

A spring element configured to join a diffuser ring and combustor is disclosed and described above. In various embodiments, the spring element enables the combustor to extend axially with respect to the diffuser ring due to thermal loads arising through the combustion process. In various embodiments, the combination of the diffuser ring, the spring element and the combustor are manufactured using an additive manufacturing process, whereby the resulting combination of components is a single, monolithic component that can be assembled into a gas turbine engine or, more particularly, a miniature gas turbine engine, intended for single or limited use applications. In various embodiments, the combination of the diffuser ring, the spring element and the combustor comprise one or more of titanium or titanium alloys, nickel-based super alloys, such as, for example, the nickel chromium-based super alloy Inconel 625 or similar such materials.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A component for a gas turbine engine, comprising:
   a diffuser ring;
   a combustor; and
   a spring element connecting the diffuser ring to the combustor,
   wherein the diffuser ring, the spring element and the combustor comprise a single, monolithic component,
   wherein the spring element includes a radially inner surface and a radially outer surface, wherein at least one of the radially inner surface and the radially outer surface defines an undulating surface that extends along a spring element length, wherein the spring element length extends between a forward end of the spring element and an aft end of the spring element, and wherein an aft end of the diffuser ring ends at the forward end of the spring element and the aft end of the spring element ends at a forward end of a radially outer wall of the combustor.

2. The component of claim 1, wherein the combustor includes a radially inner wall and the radially outer wall.

3. The component of claim 1, wherein the radially inner surface includes a radially inner undulating surface and the radially outer surface includes a radially outer undulating surface.

4. The component of claim 1, wherein the radially outer surface includes a radially outer undulating surface and the radially inner surface includes a radially inner flat surface.

5. The component of claim 2, wherein the spring element includes a spring element local thickness that is less than or equal to one or both of a radially outer wall thickness and a diffuser ring thickness.

6. The component of claim 5, wherein the radially outer surface includes a radially outer undulating surface that is characterized by one or more of a sine wave, a triangle wave or a saw-tooth wave.

7. The component of claim 6, wherein the radially inner surface is characterized by a radially inner flat surface.

8. The component of claim 5, wherein the radially inner surface includes a radially inner undulating surface, wherein the radially outer surface includes a radially outer undulating surface and wherein both the radially inner undulating surface and the radially outer undulating surface are characterized by one or more of a sine wave, a triangle wave or a saw-tooth wave.

9. A gas turbine engine component manufactured by an additive manufacturing process, comprising:
a diffuser ring;
a combustor; and
a spring element connecting the diffuser ring to the combustor,
wherein the diffuser ring, the spring element and the combustor comprise a single, monolithic component,
wherein the spring element includes a radially inner surface and a radially outer surface,
wherein at least one of the radially inner surface and the radially outer surface defines an undulating surface that extends along a spring element length, wherein the spring element length extends between a forward end of the spring element and an aft end of the spring element, and
wherein an aft end of the diffuser ring ends at the forward end of the spring element and the aft end of the spring element ends at a forward end of a radially outer wall of the combustor.

10. The gas turbine engine component of claim 9, wherein the combustor includes a radially inner wall and the radially outer wall.

11. The gas turbine engine component of claim 10, wherein the spring element includes a spring element local thickness that is less than or equal to one or both of a radially outer wall thickness and a diffuser ring thickness.

12. The gas turbine engine component of claim 11, wherein the spring element includes a spring element global thickness that is less than or equal to one or both of the radially outer wall thickness and the diffuser ring thickness.

13. The gas turbine engine component of claim 12, wherein the spring element includes a radially inner surface and a radially outer surface and wherein at least one of the radially inner surface and the radially outer surface includes an undulating surface.

14. The gas turbine engine component of claim 13, wherein the radially outer surface includes a radially outer undulating surface and wherein the radially outer undulating surface is characterized by one or more of a sine wave, a triangle wave or a saw-tooth wave.

15. The gas turbine engine component of claim 13, wherein the radially inner surface is characterized by a radially inner flat surface.

16. The gas turbine engine component of claim 13, wherein the radially inner surface includes a radially inner undulating surface, wherein the radially outer surface includes a radially outer undulating surface and wherein both the radially inner undulating surface and the radially outer undulating surface are characterized by one or more of a sine wave, a triangle wave or a saw-tooth wave.

17. An aircraft, comprising:
a fuselage having an intake duct and an exhaust duct; and
a gas turbine engine configured to receive air from the intake duct and to expel the air through the exhaust duct following a combustion process, the miniature gas turbine engine comprising:
a diffuser ring;
a combustor; and
a spring element connecting the diffuser ring to the combustor,
wherein the diffuser ring, the spring element and the combustor comprise a single, monolithic component,
wherein the spring element includes a radially inner surface and a radially outer surface,
wherein at least one of the radially inner surface and the radially outer surface defines an undulating surface that extends along a spring element length, wherein the spring element length extends between a forward end of the spring element and an aft end of the spring element, and
wherein an aft end of the diffuser ring ends at the forward end of the spring element and the aft end of the spring element ends at a forward end of a radially outer wall of the combustor.

18. The aircraft of claim 17, wherein the combustor includes a radially inner wall and a radially outer wall, the spring element being connected to the radially outer wall, wherein the spring element includes a spring element local thickness that is less than or equal to one or both of a radially outer wall thickness and a diffuser ring thickness.

* * * * *